United States Patent
Kunzinger et al.

[11] 3,875,493
[45] Apr. 1, 1975

[54] FERRORESONANT POWER CONVERTER WITH CONTROL OF INVERTER FREQUENCY AND SENSING OF SATURATION CONDITION

[75] Inventors: Frederick Francis Kunzinger, Parsippany; Weyman Blanchard Suiter, Jr., Whippany, both of N.J.

[73] Assignee: Bell Telephone Laboratories, Incorporated, Murray Hill, N.J.

[22] Filed: Apr. 2, 1974

[21] Appl. No.: 457,219

[52] U.S. Cl. .................... 321/18, 321/2, 321/10, 321/25, 323/60
[51] Int. Cl. .................... H02m 3/32, G05f 1/56
[58] Field of Search ............ 321/2, 10, 16, 18, 25, 321/45 R; 331/113 A, 109, 183; 323/60, 61

[56] References Cited
UNITED STATES PATENTS

| | | | |
|---|---|---|---|
| 3,458,797 | 7/1969 | Larsen | 323/60 X |
| 3,584,289 | 6/1971 | Bishop et al. | 321/18 |
| 3,590,362 | 6/1971 | Kakalec | 321/18 X |
| 3,679,962 | 7/1972 | Wanlass | 321/2 X |
| 3,699,424 | 10/1972 | Hart et al. | 321/45 R |
| 3,739,255 | 6/1973 | Leppert | 321/18 X |
| 3,815,015 | 6/1974 | Swin et al. | 321/2 X |
| 3,818,314 | 6/1974 | Bishop et al. | 321/45 R |

*Primary Examiner*—Gerald Goldberg
*Attorney, Agent, or Firm*—J. S. Cubert

[57] ABSTRACT

A transformer in combination with a push-pull transistor switch forms the inverter of a DC to DC converter. Feedback from the rectified output of the transformer ferroresonant winding controls the inverter frequency. A controllable current source responsive to a signal derived from the converter output voltage controls the charging of a timing capacitor which, upon reaching a threshold value, causes termination of each inverter half-cycle. A capacitor discharge arrangement is included to ensure continuity of inverter frequency under light load conditions when inverter half-cycle termination results from transformer saturation.

8 Claims, 1 Drawing Figure

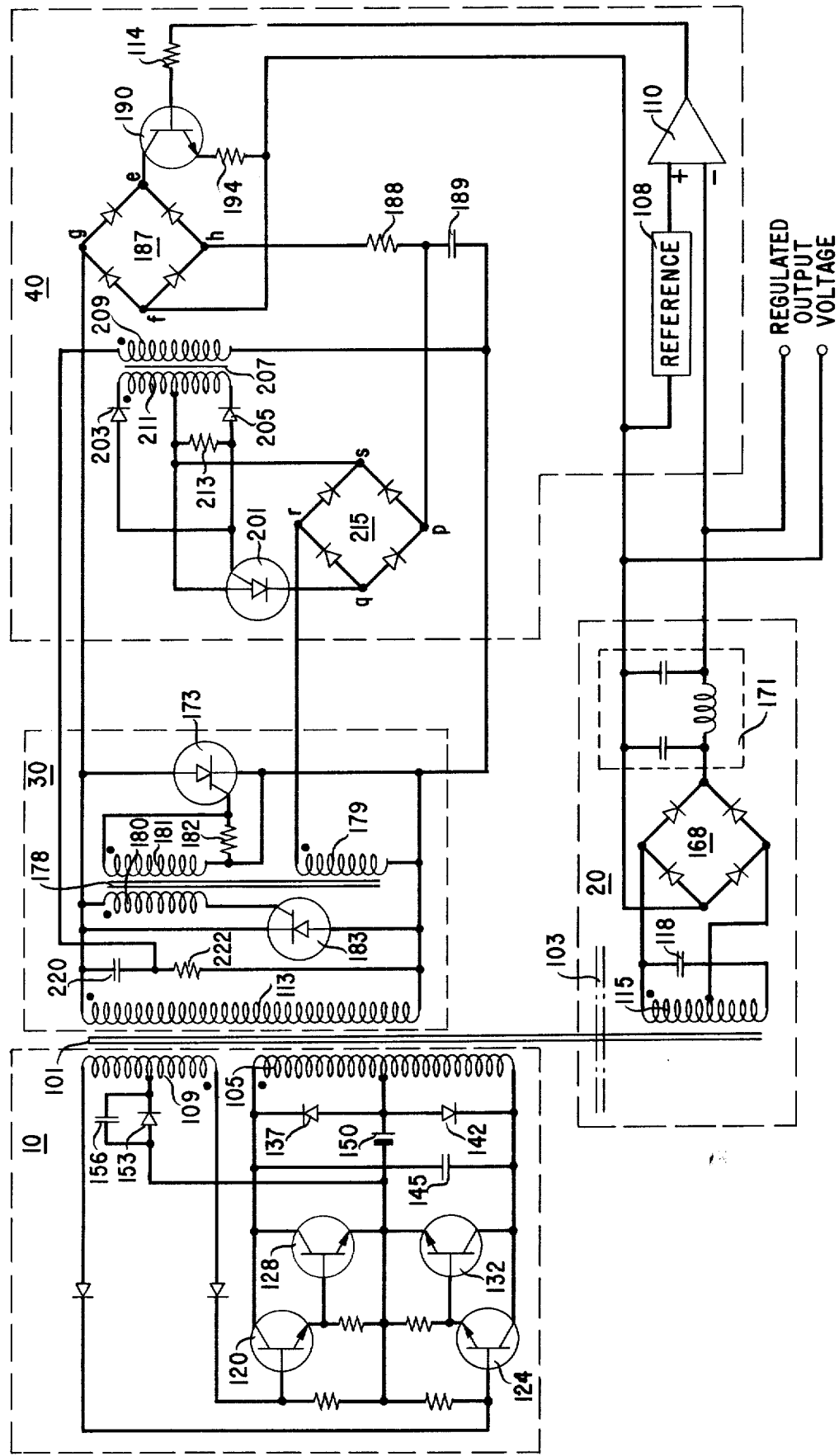

FERRORESONANT POWER CONVERTER WITH CONTROL OF INVERTER FREQUENCY AND SENSING OF SATURATION CONDITION

BACKGROUND OF THE INVENTION

Our invention relates to power conversion apparatus, more particularly to a DC power converter using an inverter in conjunction with a ferroresonant transformer, and more particularly to a regulated DC to DD converter wherein the output voltage is utilized to control the inverter frequency.

Complex electronic systems generally require a number of different regulated voltages which must be held to close tolerances under widely varying load conditions. It is important that the supply apparatus providing the regulated voltages be efficient to limit power usage and heat dissipation. In an electronic system, unnecessary heat dissipation from a number of power supplies may limit the system capability.

U.S. Pat. No. 3,699,424, issued to H. P. Hart et al on Oct. 17, 1972, and assigned to the same assignee, discloses a DC to DC converter utilizing an inverter and a ferroresonant regulator. Since the output of the regulator is a function of frequency, the converter output voltage is readily regulated by controlling the inverter frequency. In Hart et al, the inverter frequency control is obtained by switching an inductor across the control winding of the inverter transformer responsive to a timing capacitor attaining a threshold voltage. The switching action is effective to terminate each half-cycle of the inverter. The timing capacitor charging rate is controlled by an impedance connected to the control winding and in parallel with an amplifier whose impedance is a function of the converter output voltage. A similar feedback regulation arrangement is disclosed in Bishop et al, application Ser. No. 368,757, filed June 11, 1973.

In the Hart et al and Bishop et al arrangements, the voltage across the timing capacitor must attain a threshold level to control the inverter frequency. Under light load conditions, the charging may be at such a low rate that the timing capacitor voltage remains below the threshold value. In this event, the inverter half-cycle is terminated by magnetic saturation of the inverter transformer. At such half-cycle termination, the timing capacitor is not discharged to a predetermined voltage at the termination of each half-cycle. This causes variations in half-cycle termination points so that control of the inverter frequency responsive to the fed-back output voltage is adversely affected. The result of such operation is a hysteresis effect. Where a plurality of converters are operated in parallel under light load conditions, the aforementioned hysteresis effect may cause oscillation between the paralleled converters whereby the load is not properly served.

It is an object of the invention to provide a DC to DC converter circuit with improved feedback regulation.

It is another object of the invention to provide an improved DC to DC converter circuit in which effective feedback regulation is maintained over an extended range of operation.

It is another object of the invention to provide a DC to DC converter using an inverter in combination with a ferroresonant transformer wherein abrupt changes in output under light load conditions are prevented.

BRIEF SUMMARY OF THE INVENTION

The invention is a DC to DC converter wherein a transformer having a ferroresonant winding is combined with a push-pull transistor switching circuit to form an inverter. A feedback arrangement controls the inverter frequency responsive to the converter output obtained from the ferroresonant transformer winding. The feedback loop includes a capacitor which determines the termination of each inverter half-cycle via switching means connected to the transformer. A controllable current source responsive to the converter output voltage controls the charging rate of said capacitor. A switching device responsive to the termination of each half-cycle of the inverter resulting from either the capacitor attaining a threshold voltage or from saturation of the inverter transformer discharges the feedback loop capacitor to a predetermined state whereby hysteresis effects are avoided.

In an embodiment illustrative of the invention, first and second transistor type switches are connected in a push-pull arrangement with the primary winding of a ferroresonant transformer to form an inverter. A second winding regeneratively returns the transformer primary output alternately to the inputs of the first and second switches to maintain inverter oscillation. A control winding on the transformer has a common magnetic path with the primary winding and a secondary ferroresonant winding is isolated from the primary and control windings by a magnetic shunt. A capacitor is combined with the secondary winding to form a ferroresonant circuit from which the converter output voltage is obtained. Frequency determining switching circuitry connected across the control winding includes a timing capacitor charged through a controllable current source. Upon attaining a predetermined threshold, the timing capacitor is discharged causing a gated switch to short circuit the control winding whereby the inverter half-cycle is terminated. The feedback arrangement, including the current source, controls the frequency of the inverter responsive to the converter output voltage.

A differentiating circuit is connected across the control winding. The differentiating circuit is operative to generate a narrow pulse upon termination of each inverter half-cycle and to control the rate of charge across the control windings. Under light load conditions, the half-cycle termination may result from transformer primary winding saturation. This occurs when the timing capacitor does not attain its threshold value before the primary winding current causes saturation. The generated pulse is coupled via a diode rectifier to momentarily turn on a semiconductor switch, which switch discharges the timing capacitor to a predetermined state and aids in half-cycle termination. By ensuring a fixed voltage across the timing capacitor at each half-cycle termination, unstable frequency characteristics under light load conditions are avoided.

BRIEF DESCRIPTION OF THE DRAWING

The FIGURE depicts a schematic diagram of an embodiment illustrative of the invention.

DETAILED DESCRIPTION OF THE DRAWING

The DC to DC converter of the FIGURE includes inverter 10, ferroresonant output circuit 20, inverter frequency determining circuit 30, and feedback circuit 40 which controls the frequency of inverter 10 responsive to the output of circuit 20. Inverter 10 is powered by DC source 150 which may comprise a battery or other potential source. Transistors 120 and 128 form a Darlington pair transistor switch well known in the art, and transistors 124 and 132 similarly form another Darlington pair transistor switch. These transistor switches are connected in a push-pull arrangement with windings 105 and 109 of transformer 101. Alternate turn-on of transistor switch pair 120 and 128 and transistor switch pair 124 and 132 alternately magnetizes transformer 101 via primary winding 105 whereby an alternating voltage appears across primary winding 105. The primary winding voltage waveform is a square wave. Inverter circuit 10 responds to frequency determining circuit 30 which causes a short circuit impedance to appear across winding 105 at the termination of each half-cycle whereby push-pull oscillation is obtained.

It is assumed, for purposes of illustration, that inverter circuit 10 is operating in its steady state condition. The starting of the inverter circuit is accomplished by the use of a special starting circuit (not shown) which may comprise a series R-C network connected between power source 150 and the input of one of the inverter transistor switches. Upon power turn-on, the previously uncharged R-C network provides an initial start pulse to one transistor switch. Alternatively, an imbalance between the transistor switches may provide start of oscillation.

Consider the state of the inverter when switching transistors 120 and 128 are conducting and transistor 128 is saturated while transistors 124 and 132 are cut off. At this time, a current flows from source 150 through one-half of primary winding 105 and through the collector-emitter paths of transistors 120 and 128 back to source 150. The current increases in primary winding 105 as long as the gain of transistor pair 120 and 128 is sufficient to support primary winding current. The flux coupling between windings 105 and 109 induces a voltage in winding 109 which maintains the saturated conduction of transistor pair 120 and 128 and keeps transistors 124 and 132 in their cut-off condition. The voltage across primary winding 105 causes a voltage to appear across control winding 113. The control winding and primary winding voltages are maintained until a short circuit is placed across control winding 113 by turn on of one of silicon controlled rectifiers 173 and 183 responsive to the operation of circuit 40.

Control winding 113 is closely coupled to drive winding 109, but is relatively loosely coupled to primary winding 105. When a short circuit impedance is placed across winding 113 by a conducting silicon controlled rectifier at the termination of an inverter half-cycle, a very low impedance is reflected across winding 109. But there is only a minor reduction in the impedance across winding 105. Responsive to the low reflected impedance in winding 109, transistors 120 and 128 turn off and the decreasing collector current of transistor 128 causes a voltage reversal in winding 105.

Capacitor 145 forms a series resonant circuit with the leakage inductance between windings 105 and 113. The resonant frequency of the leakage inductance and capacitor 145 combination is determined by the desired inverter switching time. The changing voltage in the resonant circuit causes a sinusoidal current in control winding 113. When this sinusoidal current passes through zero, the conducting silicon controlled rectifier turns off. The reverse voltage in winding 105 then reverses the voltage across winding 109 and transistors 124 and 132 are regeneratively turned on to start the next inverter half-cycle, during which half-cycle transistors 124 and 132 conduct.

Capacitor 156 and diode 153 are operative to prevent simultaneous turn on of both transistor switches. During the half-cycle transistors 120 and 128 are conducting, capacitor 156 is charged to the voltage across diode 153. Upon short circuiting of winding 109 the voltage across capacitor 156 provides a reverse bias to transistors 120 and 124 so that both transistor switches are turned off. When the short circuit is removed, the voltage across winding 109 causes transistor 124 to conduct and reverse bias to transistor 120 so that the new half-cycle is started. Diodes 137 and 142 provide protection for the transistor switches from high reverse voltage transients.

Ferroresonant output circuit 20 is of a well-known type. Output winding 115 is wound on a saturating core portion of transformer 101. This core portion is isolated from the remaining parts of transformer 101 by magnetic shunts 103. Capacitor 118 is connected across winding 115 to form a ferroresonant circuit. The core portion on which winding 115 is wound saturates every half-cycle at a fixed voltage time integral to reverse the voltage on capacitor 118 in typical ferroresonant regulator operation well known in the art. Bridge rectifier 168 is connected across winding 115 to provide a DC output voltage. II-type filter network 171 is connected across the output side of bridge rectifier 168 to provide filtering.

The inverter frequency is determined by the charging of timing capacitor 189. Capacitor 189 is connected in series with resistor 188 and transistor current source 190 which is coupled between control winding 113 and capacitor 189 by rectifier bridge 187. In each positive half-cycle, the voltage across winding 113 is positive from point $g$ on rectifier bridge 187 to the lower side of capacitor 189. Capacitor 189 is charged through the path $g-e$ of rectifier 187, the collector-emitter path of transistor 190, emitter resistor 194, the path $f-h$ of rectifier 187, and resistor 188. The charging current is determined by the current through transistor 190 because of the high collector impedance resulting from use of emitter resistor 194.

Capacitor 189 is charged positively through current source transistor 190 during the positive half-cycle of the inverter. The voltage across capacitor 189 is applied through path $p-s$ of bridge rectifier 215 to the anode of switching diode 201. The cathode of switching diode 201 is connected to winding 179 of transformer 178 via path $q-r$ of rectifier 215. Upon capacitor 189 attaining the threshold voltage determined by the characteristics of diode 201, diode 201 is rapidly turned on. Capacitor 189 is then discharged through diode 201, rectifier 215, and winding 179 of transformer 178. This discharge causes a positive voltage to appear across winding 181 of transformer 178. Control rectifier 173 is fired to provide a short circuit across control winding 113 of transformer 101. The short circuit across control winding 113 is reflected into windings 109 and 105 and the positive half-cycle of the inverter is terminated.

In the succeeding negative half-cycle, the lower side of capacitor 189 is positive with respect to point $g$ of bridge rectifier 187. Current flows through capacitor 189, resistor 188, path $h-e$ of rectifier 187, the collector-emitter path of transistor 190, emitter resistor 194, and path f–g of rectifier 187. Capacitor 189 is charged in the opposite direction and the negative voltage from capacitor 189 is applied to the cathode of switching diode 201 via path p–q of rectifier 215. The anode of diode 201 is connected in series with winding 179 of transformer 178 through path r–s of rectifier 215. Upon capacitor 189 attaining the threshold value, diode 201 is turned on whereby a positive voltage pulse is coupled across winding 180 of transformer 178. This positive voltage fires silicon controlled rectifier 183 which short circuits control winding 113 of transformer 101. In this way, the negative half-cycle of the inverter is terminated.

Upon termination of each half-cycle, the voltage across control winding 113 is rapidly changed and this change appears as a narrow pulse across resistor 222 of the differentiating network comprising capacitor 220 and resistor 222. The narrow pulse from the differentiating network is applied to winding 209 of transformer 207 and is coupled via the rectifier arrangement including diodes 203 and 205 to the control electrode of diode 201. In the normal operation diode 201 has already been turned on as a result of the threshold voltage across capacitor 189 and the negative pulse applied to the control electrode of diode 201 is ineffective.

The rectified and filtered converter output voltage from filter 171 is applied to the negative input of operational amplifier 110. A reference voltage which may be obtained from an avalanche diode source is developed in reference source 108 and is applied to the positive input of amplifier 110. The output of amplifier 110 is proportional to the difference between the converter output voltage and the reference voltage and is applied to the base of transistor 190 through resistor 114. If the converter output voltage is less than the reference, the voltage to the base of transistor 190 is increased. The resulting transistor collector-emitter path current is increased whereby the charging rate of capacitor 189 is increased. Consequently, the half-cycle time of the inverter is decreased so that the inverter frequency rises.

An increase in converter output voltage applied to amplifier 110 results in a lower base voltage on transistor 190, which base voltage is proportional to the difference between the converter output voltage and the voltage from reference 108. The lower base voltage causes a reduction in the collector-emitter current of transistor 190, which, in turn, reduces the charging rate of capacitor 189. Consequently, the half-cycle time of the inverter is increased whereby the inverter frequency decreases.

Under the light load conditions, a very low charging current is applied to capacitor 189 from current source transistor 190. Consequently, the voltage across capacitor 189 increases very slowly to the threshold value. During the charging of capacitor 189, the increasing current in primary winding 105 may cause transformer 101 to saturate prior to the time at which capacitor 189 reaches the threshold value. Upon saturation of transformer 101, the voltage across winding 113 rapidly reverses whereby the inverter half-cycle is terminated. In the absence of the differentiating network including capacitor 220 and resistor 222, the half-cycle terminates without a discharge of capacitor 189. Since capacitor 189 is not returned to its discharged state, the next half-cycle termination under the control of capacitor 189 has a period that significantly differs from the normal operation of the converter circuit. The magnetic saturation of the inverter under light load conditions results in a hysteresis effect which limits the lower range of operation of the converter circuit. If a plurality of inverter circuits are connected in parallel to a load, the hysteresis effect caused by half-cycle termination upon magnetic saturation of the inverter transformer may result in oscillations between the paralleled units whereby the load is not properly served.

The aforementioned hysteresis effect is eliminated in accordance with the invention by the addition of the differentiating network including capacitor 220, resistor 222, and the coupling arrangement between resistor 222 and diode 201. Upon magnetic saturation, the collapse of voltage in control winding 113 results in a narrow pulse across resistor 220. This narrow pulse is coupled through transformer 207 and one of diodes 203 and 205 to provide a negative pulse on the control electrodes of switching diode 201. The negative pulse is effective to turn on diode 201. Consequently, a low impedance path is provided to discharge capacitor 189 through rectifier 215, diode 201, and winding 179 of transformer 178. The resulting pulse in transformer 178 will be coupled to the appropriate one of silicon rectifiers 173 and 183 to provide a short circuit across control winding 113 to aid in termination of the inverter half-cycle. In this manner, capacitor 189 is always discharged to the same predetermined state whether the half-cycle termination results from the voltage across capacitor 189 attaining the threshold value or magnetic saturation of transformer 101. The hysteresis effect is avoided and the range of converter operation under light load conditions is substantially extended.

What is claimed is:

1. A DC to DC converter comprising an inverter circuit having positive and negative half-cycles of oscillation, said inverter circuit including a transformer having a primary winding, a control winding, and a ferroresonant output winding, and a pair of transistor switches connected in push-pull arrangement with said primary winding; and first means for controlling the frequency of said inverter comprising a capacitor, feedback means connected from said output winding to said capacitor for charging said capacitor during each inverter half-cycle, switching means connected across said control winding and to said capacitor responsive to the capacitor voltage attaining a predetermined value for terminating said inverter half-cycle and for discharging said capacitor to a predetermined state, said feedback means comprising a controllable current source coupled with said capacitor across said control winding responsive to the output winding voltage for charging said capacitor during each inverter half-cycle, and second means connected to said switching means responsive to the termination of each inverter half-cycle caused by magnetic saturation of said transformer primary and control windings for turning on said switching means to discharge said capacitor to said predetermined state.

2. A DC to DC converter according to claim 1 wherein said second means comprises differentiating means connected across said control winding responsive to the termination of each half-cycle caused by magnetic saturation of said primary and control windings for generating a pulse, and third means for coupling said generated pulse to said switching means to discharge said capacitor to said predetermined state.

3. A DC to DC converter according to claim 2 wherein said differentiating means comprises a series connected capacitor and resistor and a terminal at the junction of said series connected capacitor and said series connected resistor.

4. A DC to DC converter according to claim 3 wherein said third means comprises coupling transformer having a primary winding connected to said terminal and a secondary winding, and rectifying means connected between said coupling transformer secondary winding and said switching means.

5. A DC to DC converter comprising a pair of transistor switches and a transformer including a primary winding, a control winding, and a ferroresonant output winding, a magnetic path common to said primary and control windings, and a magnetic shunt for separating said control and output windings, said pair of transistor switches being coupled to said primary winding in a push-pull arrangement; switching means connected across said control winding; means for turning on said switching means to temporarily short circuit said control winding to terminate each half-cycle of said inverter comprising a timing capacitor, means for charging said timing capacitor, means connected between said timing capacitor and said switching means responsive to a predetermined voltage across said timing capacitor for applying a pulse to said turn-on means to terminate said inverter half-cycle and to discharge said timing capacitor; means responsive to the termination of each inverter half-cycle caused by magnetic saturation of said primary and control winding magnetic path for producing a pulse, said turn-on means being responsive to said produced pulse for discharging said timing capacitor to a predetermined state.

6. A DC to DC converter according to claim 5 wherein said turn-on means comprises a switching diode having first, second, and control electrodes, a bridge rectifier having first, second, third, and fourth terminals, said switching diode first electrode being connected to said bridge rectifier first terminal, said switching diode second electrode being connected to said bridge rectifier second terminal, said timing capacitor having a first terminal connected to said bridge rectifier third terminal and a second terminal, and a first coupling transformer having a primary winding connected between said bridge rectifier fourth terminal and said timing capacitor second terminal, said first coupling transformer having a secondary winding arrangement connected to said switching means, and means for coupling said produced pulse to said switching diode control electrode.

7. A DC to DC converter according to claim 6 wherein said pulse producing means comprises a differentiating capacitor and a resistor series connected across said control winding, said produced pulse appearing at the junction of said differentiating capacitor and said resistor.

8. A DC to DC converter according to claim 7 wherein said means for coupling said produced pulse to said switching diode control electrode comprises a second coupling transformer having a primary winding connected to said differentiating capacitor and resistor junction, a secondary winding, and rectifying means connected between said second coupling transformer secondary winding and said switching diode control electrode.

* * * * *